Nov. 7, 1961 F. E. HALICKI ET AL 3,007,500
AUTOMATIC STRIP PROCESSING MACHINES
Filed April 19, 1960 3 Sheets-Sheet 1

Inventors
Frank E. Halicki
Joseph C. Halicki
John J. Kolpak

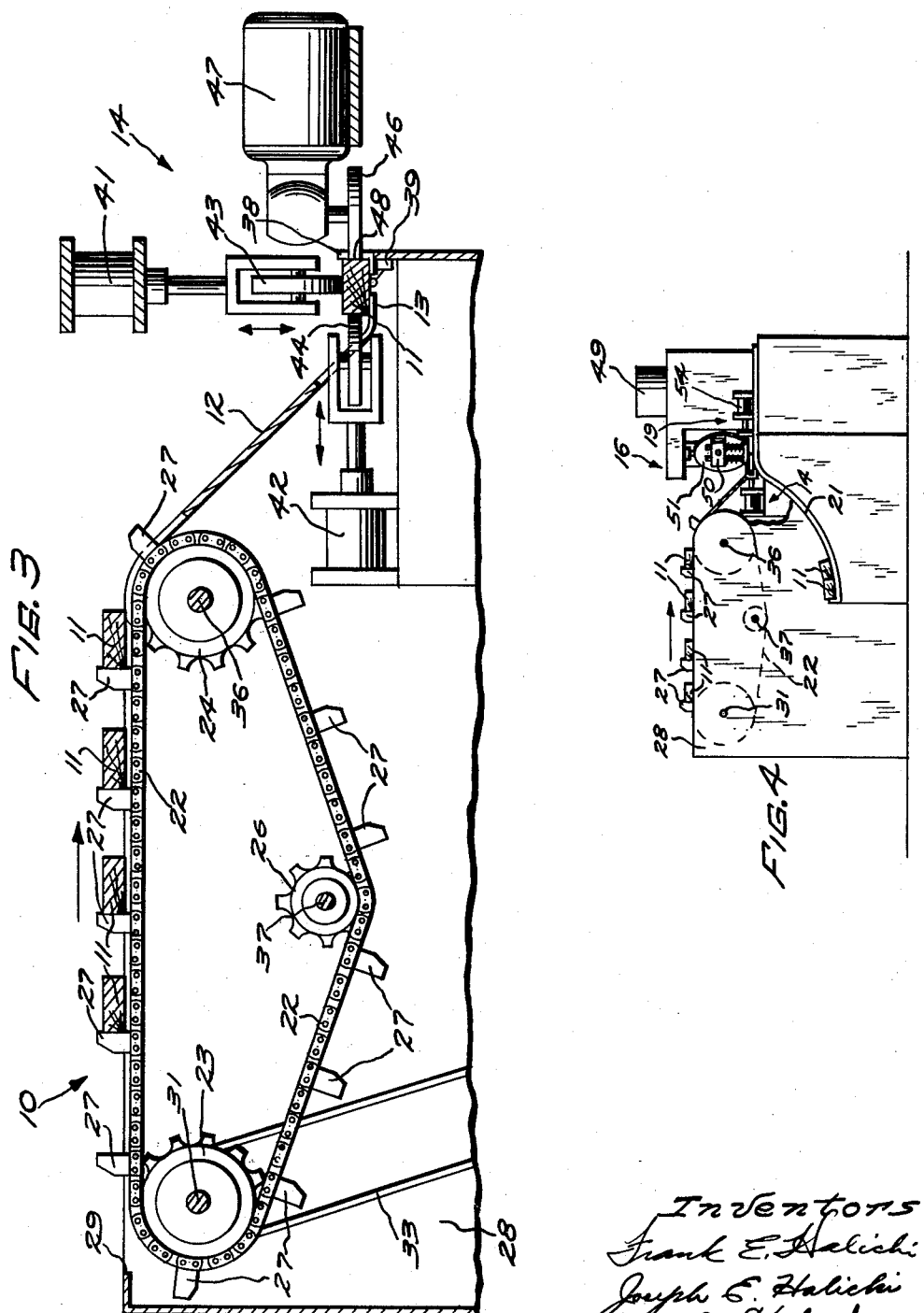

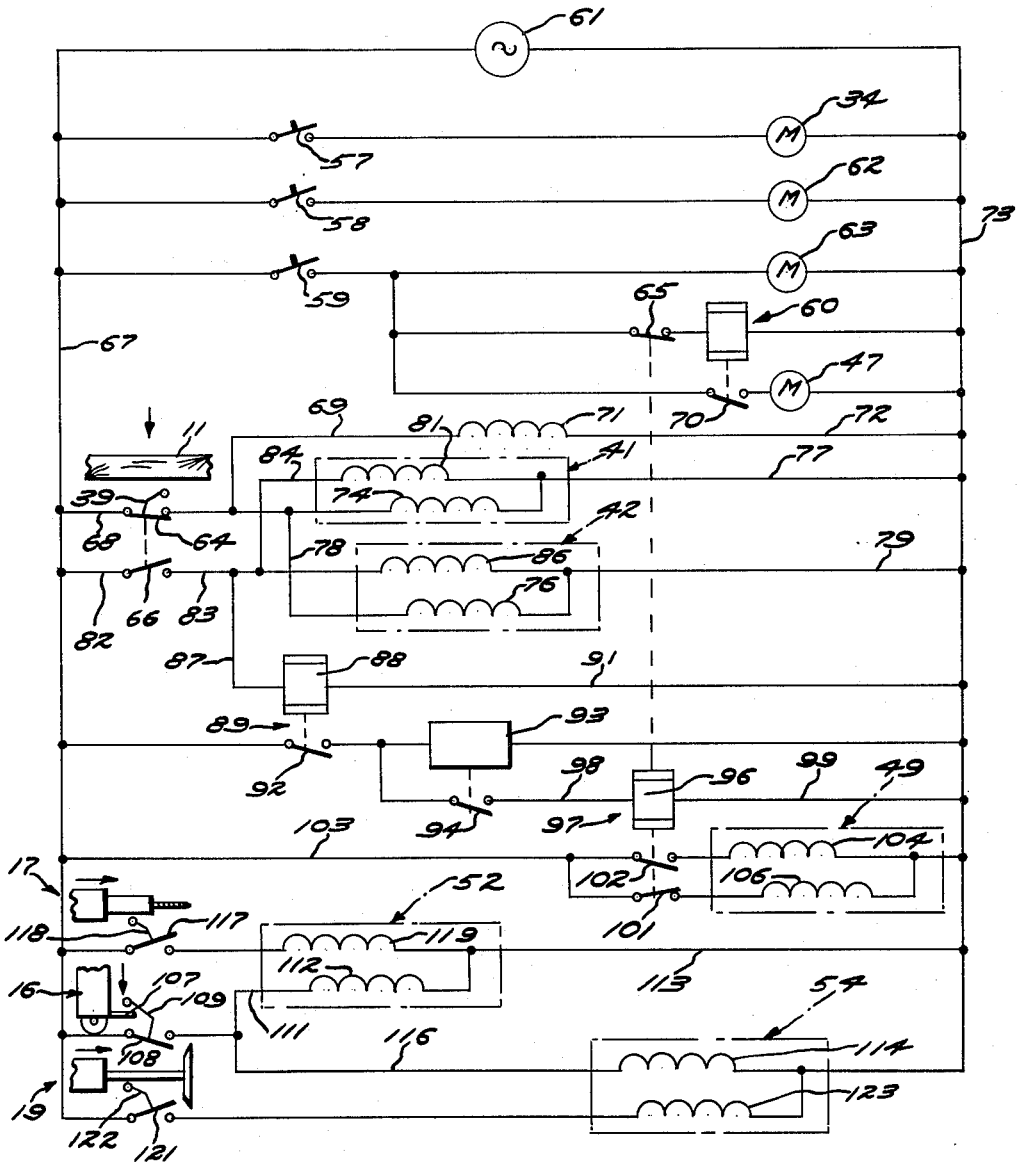

United States Patent Office 3,007,500
Patented Nov. 7, 1961

3,007,500
AUTOMATIC STRIP PROCESSING MACHINES
Frank E. Halicki, 10609 S. Keeler St., Oak Lawn, Ill.;
Joseph E. Halicki, 3100 S. Michigan Ave., Chicago,
Ill.; and John J. Kolpak, 7243 S. Oak Grove Ave.,
Justice, Ill.
Filed Apr. 19, 1960, Ser. No. 23,323
19 Claims. (Cl. 144—35)

This invention relates to an automatic strip processing machine, and more particularly, to a machine for automatically feeding, conveying, sawing, drilling, and unloading strip material.

Prior art strip processing machines have not been automatic in the sense of continuously and sequentially feeding and sawing predetermined lengths of strip material, or in combining these operations with automatic operations of loading and unloading the strip material. Such prior art machines have required a continued presence of an operator to insure that a main conveyor or feedway to the sawing apparatus is continuously supplied with strip material in order to insure continued operation of the machine. It is a requirement in many strip processing operations, as in the manufacturing of picture frame strip material, to not only saw the strip material into predetermined lengths, but also to provide small drilled apertures through the sawed strips to facilitate the assembling of the strips into a finished product, as a picture frame.

It is, therefore, an object of the present invention to provide an automatic strip processing machine for alternately conveying and sawing strip material upon placement of the material on a feedway leading to a sawing unit;

Another object of the present invention is to provide an automatic strip sawing machine for feeding strip material from a loader onto a feedway, and upon completion of this operation, for deenergizing the loader and alternately moving and sawing the material within the feedway;

Another object of the present invention is to provide an automatic strip processing machine for alternately moving, sawing and drilling strip material;

A further object of the present invention is to provide an automatic strip processing machine for moving strip material from a loader onto a feedway and upon completion of the loading operation, to deenergize the loader and to sequentially convey, saw, and drill the strip material until a successive loading operation is required; and A further object of the present invention is to provide an automatic strip processing machine for continuously performing operations of loading, conveying, sawing, drilling and unloading strip material.

With these and other objects in view, the present invention contemplates a machine having a loader conveyer for retaining a supply of strip material. Upon initial energization of the machine, the loader conveyer is operated to move a piece of strip material from the conveyer onto a feedway. Upon movement of the strip material onto the feedway, a main control circuit is energized to stop the operation of the loader conveyer and to operate a means for moving the strip material along the feedway. A repeating cycle timer unit in the main control circuit is then operated to alternately (1) saw, drill and unload the strip material and (2) to move the strip material for another sawing, drilling and unloading operation. The repeating cycle timer unit may be adjusted for varying the length of the sawed strip material by varying the length of time the strip material is moved in the feedway. After the material in the feedway is completely sawed and drilled, the main control circuit deenergizes the timer unit and again operates the loader conveyer for feeding the next successive piece of strip material into the feedway.

Other objects, advantages and novel aspects of the present invention will become apparent in the following detailed description in conjunction with the accompanying drawings wherein:

FIG. 3 is a sectional view taken along line 3—3 of FIG. 2 disclosing a loader conveyer, a feedway for strip material and apparatus for moving the strip material along the feedway;

FIG. 4 is an end elevation view of the machine disclosed in FIG. 1; and

FIG. 5 is a circuit for automatically controlling the machine disclosed in the other views.

Figure 1:
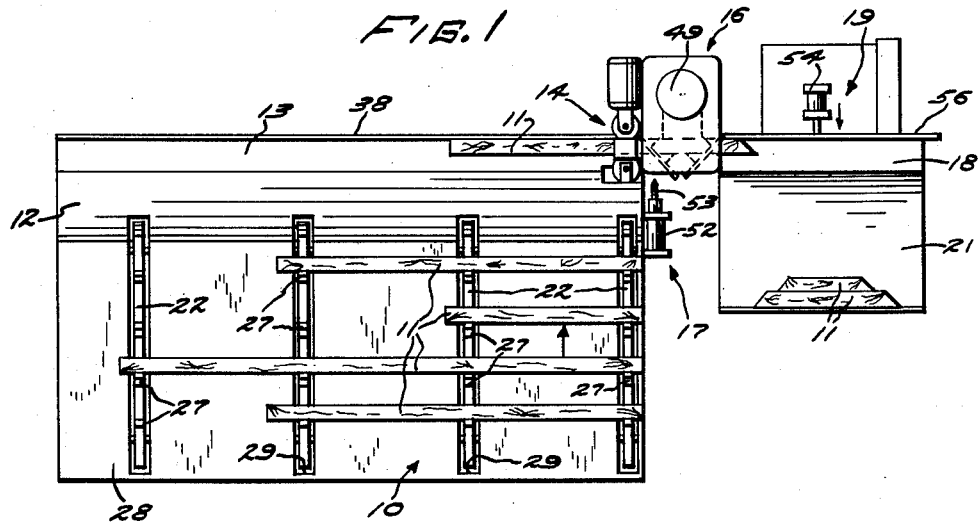
FIG. 1 is a plan view of an automatic strip processing machine embodying the principles of the present invention.

An automatic strip processing machine is disclosed in FIGS. 1–4 for automatically processing strip material for the manufacture of picture frame strips. This machine embodies the principles of the instant invention although the specific design thereof is not intended to limit the scope of the invention as defined in the claims. The machine disclosed in FIGS. 1–4 comprises a loader conveyer 10 for feeding strip material 11 onto a slide 12, the bottom portion of which forms a section of a feedway 13. A driven friction wheel apparatus, generally designated by the numeral 14, moves the strip material 11 along the feedway 13 and beneath a saw unit 16. The saw unit 16 may be of any commercially available type and is preferably a unit having two circular rotating blades disposed at 45° angles to the line of movement of the strip material 11 in the feedway 13. Positioned adjacent to the feedway 13 and in juxtaposition with the saw unit 16, is a drill unit 17. The drill unit 17 is preferably positioned in relation to the saw unit 16 such that a hole will be drilled in the angular sawed extremity of the strip to the left of the saw unit 16 as viewed in FIG. 1. As additional strip material is fed beneath the saw unit 16, the previously sawed and drilled strips are pushed onto an unloading station 18 adjacent to an unloader, generally designated by the numeral 19, which moves the strip material onto an unloading slide 21.

Referring now to FIG. 3, the loader conveyer 10 consists of a plurality of chains 22 guided over respective sprocket wheels 23, 24 and 26. Uniformly spaced along the chains 22 are lugs 27 connected to the chain and movable therewith.

Figure 2:
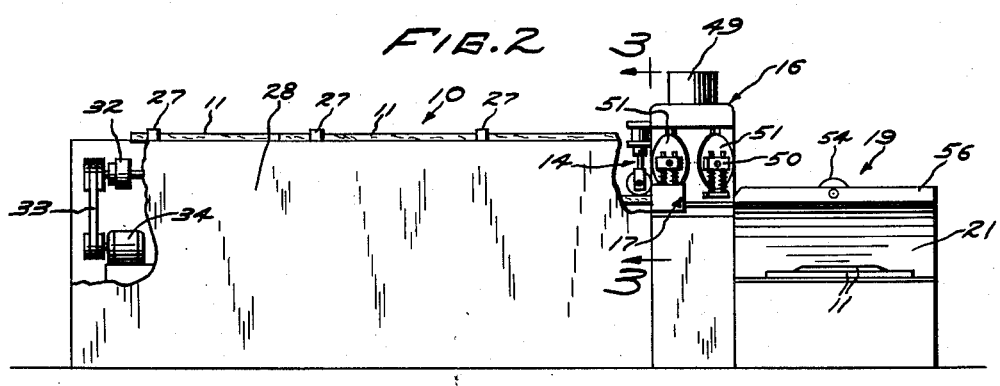
FIG. 2 is a side elevation view, partially broken away, of the machine disclosed in FIG. 1.

The chains 22 and corresponding sprocket wheels 23, 24 and 26 are enclosed within a casing 28 having slots 29 formed therein through which the lugs 27 extend. All of the sprocket wheels 23 associated with the chains 22 are fixed to a shaft 31 driven through a clutch 32 and a belt 33 which is in turn driven by a motor 34 (FIG. 2). The sprocket wheels 24 and 26 associated with the chains 22 are mounted to shafts 36 and 37 respectively, which are rotatably mounted within the casing 28 by any suitable means (not shown).

In the operation of the machine, an operator places strip material 11 on the loader conveyor 10, which may be of any desired length, such that the strips 11 are in engagement with the lugs 27 extending through the slots 29 in the casing 28. The operation of the loader conveyor 10, by means of the motor 34 and clutch 32, causes the forwardmost strip 11 to move down the slide 12 and against a guide 38 defining one side of the feedway 13. The movement of the strip material 11 onto the feedway 13 depresses a limit switch 39 which operates a control circuit disclosed in FIG. 5 to disengage the clutch 32 and thereby prevent feeding of the next successive strip 11 onto the feedway 13. The switch 39 also causes the energization of a pair of double acting solenoids 41 and 42 which move a pair of freely rotatable wheels 43 and 44 into engagement with the strip material 11. The strip material is thereby forced downwardly and to the right, as viewed in FIG. 3, against a wheel 46 driven by a motor 47 and which extends through a suitable aperture 48 in the guide 38 of the feedway 13. The wheels 43, 44 and 46 thereby serve the dual purpose of clamping the strip material 11 within the feedway 13 and moving the material along the feedway.

Upon movement of the strip material 11 along the feedway 13 to a position beneath the saw unit 16, the motor 47 driving the wheel 46 is deenergized and a double acting solenoid 49 is operated to successively advance and retract a pair of rotating saw blades 51, towards and away from the strip material. The saw blades 51 are positioned at 45° angles to the feedway 13 for sawing a small substantially triangular section from the strip material. Each saw blade may be provided with a spring biased clamp 50 which moves ahead of the blade and clamps the strip material just prior to the sawing operation. A double acting solenoid 52 of the drill unit 17 is operated upon the retraction of the saw blades 51 to move a drill bit 53 towards and away from the feedway 13 to drill an aperture in the sawed extremity of the strip material 11.

The operations of the friction wheel apparatus 14 and saw and drill units 16 and 17 are alternately performed to saw and drill predetermined lengths of the strip material 11. After each operation of the saw and drill units 16 and 17, the sawed portions of the strip material are moved onto the unloading station 18, whereupon the unloader 19, comprising of a double acting solenoid 54 connected to a pusher 56, is operated simultaneously with the drill unit 17 to move the sawed strip onto the unloading slide 21.

*Operation*

The operation of the above described machine is controlled by the circuit disclosed in FIG. 5. In the operation of the machine, an operator closes switches 57, 58 and 59 which completes a circuit from an A.C. power source 61 through the motor 34 operating the loader conveyor 10 and motors 62 and 63 operating the saw unit and drill unit respectively. A circuit is also completed through the switch 59, contacts 65 and a time delay relay 60 which closes contacts 70 to operate the motor 47 of the friction wheel 46 after a predetermined time delay. Assuming the feedway 13 to be empty at this point, the limit switch 39 will be in the normal position with contacts 64 and 66 in the closed and open positions respectively. The contacts 64 of the switch 39 completes a circuit from the A.C. power source 61 through conductors 67 and 68, contacts 64, conductor 69, a coil 71 of the loader conveyer clutch 32 through conductors 72 and 73 back to the power source 61 thereby engaging the clutch 32 and driving the loader conveyer 10. The loader conveyer 10 will operate until a piece of strip material 11 is moved down the slide 12 to the feedway 13 and the switch 39 is thereby depressed to open contacts 64 and close contacts 66. The opening of contacts 64 breaks the energizing circuit for the coil 71 of the clutch 32 to stop the operation of the loader conveyer 10.

The opening of the contacts 64 also deenergizes a retract coil 74 of the double acting solenoid 41 and deenergizes the retract coil 76 of the double acting solenoid 42 to prepare the freely rotatable wheels 43 and 44 for advancement towards the strip material 11 in the feedway 13. The coil 74 had previously been energized through a circuit from the power source 61, conductors 67 and 68, closed contacts 64 through coil 74 and conductors 77 and 73 to the power source 61 and the coil 76 had been energized from the contacts 64 through the conductors 78, 79 and 73 to the power source 61.

The contacts 66 of the switch 39 energizes an advance coil 81 of the solenoid 41 through a circuit from the power source 61, conductors 67 and 82, contacts 66, conductors 83 and 84, coil 81 and through conductors 77 and 73 to the power source 61. An advance coil 86 of the solenoid 42 is energized from the power source 61 connected to the contacts 66 through the conductor 83, the coil 86, and back to the source 61 through conductors 79 and 73. The solenoids 41 and 42 are thereby operated to force the wheels 43 and 44 against the strip material 11 to move the strip material against the driven wheel 46.

Contacts 66 of switch 39 also complete a circuit from the source 61 through conductors 67, 83 and 87, a coil 88 of a time delay relay 89 and conductors 91 and 73 back to the source 61. After a predetermined time delay, sufficient to allow the strip material 11 to move along the feedway to a position beneath the saw unit 16, contacts 92 of the relay 89 are closed to complete a circuit through a repeating cycle timer unit 93. The timer unit 93 may be of any commercially available type which alternately opens and closes contacts 94 thereof for predetermined lengths of time which are adjustable as desired. Upon closure of contacts 92 of relay 89, the timer 93 operates to close contacts 94 which completes an energized circuit through a coil 96 of a relay 97 through conductors 98, 99 and 73, to open contacts 65 and 101 and close contacts 102 thereof.

The opening of contacts 65 breaks the energizing circuit for the time delay relay 60 which thereby opens contacts 70 to deenergize the motor 47. The motor 47 stops the rotation of the driven wheel 46 and thereby prevents the feeding of the strip material 11 in the feedway 13. Contacts 102 of relay 97 completes a circuit from the source 61 through conductors 67, 103, contacts 102, advance coil 104 of the double acting solenoid 49 back to the source 61 through conductor 73. The saw unit 16 moves downwardly to cut a V-shaped portion out of the strip material 11. At the end of the advance sawing stroke, the timer 93 operates to open contacts 94 thereof, thereby deenergizing relay 97 to close contacts 65 and 101 and open contacts 102. Closure of contacts 65 again completes an energizing circuit for the time delay relay 60 to prepare for the operation of the motor 47, however, due to the slow-to-operate characteristics of the relay 60, the motor 47 does not at this time start. Opening of contacts 102 breaks the circuit through the advance coil 104 of the solenoid 49 and closure of contacts 101 completes an energizing circuit through a retract coil 106 of the solenoid 49 to return the saw unit 16 to its normally retracted position.

The saw unit 16 is provided with a lug 107 which momentarily closes contacts 108 of a switch 109 to complete an operating circuit from contacts 108 through conductor 111, advance coil 112 of the double acting solenoid 52 to the power source 61 through conductors 113 and 73. Simultaneously with the energizing of coil 112, an advance coil 114 of the double acting solenoid 54 is energized from the contacts 108 through conductors 116 and 73 to the power source 61. The solenoids 52 and 54 advance the drill unit 17 and the unloader 19 respectively to drill an aperture in the cut extremity of the strip material 11 and to unload cut and drilled portions of the strip material on the unloading station 18. Upon advancement of the drill unit 17, the drill unit closes contacts 117 of a switch 118 to complete a circuit through a retract coil 119 of the solenoid 52 to return the drill unit 17 to the normally retracted position thereof. Similarly, the advancement of the unloader 19 closed contacts 121 of a switch 122 to energize a retract coil 123 of the solenoid 54 to move the unloader to its normally retracted position.

After the advancement and retraction of the drill unit 17 and the unloader 19, the time delay relay 60 has provided a sufficient interval to complete these operations and thereafter operates to close contacts 70 to again operate the motor 47. The friction wheel apparatus 14 is again operated to move the strip material 11 within the feedway 13 until the repeating cycle timer unit 93 operates to close contacts 94. The length of time that the contacts 94 remain open depends upon the desired length of the cut sections of the strip material and the length of time that the contacts 94 are closed will depend upon the thickness and type of wood making up the strip material 11.

The operation of the timer unit 93 thereby continues to alternately cause the strip material 11 to be moved along the feedway 13 and to be sawed, drilled and unloaded by units 16, 17 and 19 respectively. When the last of the strip material 11 passes the driven wheel 46, the switch 39 is released to again close contacts 64 and open contacts 66. Opening of contacts 66 deenergizes advance coils 81 and 86 of solenoids 41 and 42 and the closure of contacts 64 energizes retract coils 74 and 76 of solenoids 41 and 42 to retract the wheels 43 and 44 of the friction wheel apparatus 14. Closure of contacts 64 also operates to again energize the coil 71 of the clutch 32 to cause engagement of the clutch and again operate the loader conveyer 10. Operation of the loader conveyer 10 will again cause the feeding of a piece of strip material 11 down the slide 12 and onto the feedway 13 which closes the switch 39 to repeat the above described operating cycle.

It may be understood therefore that the above described strip processing machine will operate continuously and automatically as long as strip material is on the loader conveyer 10. To facilitate sustained operation of the machine, a hopper of any desirable construction may be placed in relation to the loader conveyer 10 to continuously supply strip material into the conveyer.

It is to be understood that the above described operation, arrangements of apparatus and construction of the elemental parts are simply illustrative of the application of the principles of this invention and many modifications may be made thereto without departing from the scope and spirit of the invention.

What is claimed is:

1. In a strip sawing machine, a feedway having work supporting and guiding surfaces for supporting strip material for movement therealong, a sawing means positioned adjacent to the feedway, first means for moving the strip material along the feedway, second means for moving the sawing means into the path of the strip material, control means for alternately operating said first and second means, and means operable upon the placement of strip material on the feedway for actuating the control means.

2. In a strip sawing machine, a feedway having work supporting and guiding surfaces for supporting strip material for movement therealong, a loader for retaining a supply of strip material and feeding the material onto the feedway, sawing means positioned adjacent the feedway, first means for moving the strip material along the feedway, second means for moving the sawing means into the path of the strip material, control means for alternately operating said first and second means, and means operable upon the feeding of strip material onto the feedway for stopping the loader and actuating the control means.

3. In a strip processing machine, a feedway having work supporting and guiding surfaces for supporting strip material for movement therealong, a saw positioned adjacent to the feedway, first means for moving the strip material along the feedway, second means for advancing and retracting the saw towards and away from the strip material, a drill positioned adjacent the feedway, means operable upon the retracting movement of said saw for advancing and retracting the drill towards and away from the strip material, and control means for alternately operating the first and second means.

4. In a strip processing machine, a feedway having work supporting and guiding surfaces for supporting strip material for movement therealong, a saw and a drill positioned adjacent to the feedway, first means for moving the strip material along the feedway, second means for advancing and retracting the saw and drill towards and away from the strip material, control means for alternately operating the first and second means, and means operable upon placement of strip material on the feedway for actuating the control means.

5. In a strip processing machine, a feedway having work supporting and guiding surfaces for supporting strip material for movement therealong, a loader for retaining a supply of strip material and feeding the material one strip at a time onto the feedway, a saw positioned adjacent to the feedway, first means for moving the strip material along the feedway, second means for advancing and retracting the saw towards and away from the strip material, a drill positioned adjacent the feedway, means operable by the retracting movement of the saw for advancing and retracting the drill towards and away from the strip material, control means for alternately operating the first and second means, and means operable upon the feeding of strip material onto the feedway for stopping the loader and actuating the control means.

6. In an automatic strip processing machine; a feedway having work supporting and guiding surfaces for supporting strip material for movement therealong; a saw, a drill and a pusher each positioned adjacent the feedway for movement towards and away from the strip material to saw, drill and unload the strip material respectively; first means for moving the strip material along the feedway; second means for advancing and retracting the saw, drill and pusher towards and away from the strip material; and control means for alternately operating the first and second means.

7. In an automatic strip processing machine; a feedway having work supporting and guiding surfaces for supporting strip material for movement therealong; a saw, a drill and a pusher each positioned adjacent the feedway for movement towards and away from the strip material to saw, drill and unload the strip material respectively; first means for moving the strip material along the feedway; second means for advancing and retracting the saw towards and away from the strip material; means operable by the retracting movement of the saw for advancing and retracting the drill and pusher towards and away from the strip material; control means for alternately operating the first and second means; and means operable upon placement of strip material upon the feedway for actuating the control means.

8. In an automatic strip processing machine; a feedway having work supporting and guiding surfaces for supporting strip material for movement therealong; a loader for retaining a supply of strip material and feeding the material onto the feedway; a saw, a drill and a pusher each positioned adjacent the feedway for movement towards and away from the strip material to saw, drill and unload the strip material respectively; first means for moving the strip material along the feedway; second means for advancing and retracting the saw towards and away from the strip material; means operable by the retracting movement of the saw for advancing and retracting the drill and pusher towards and away from the strip material; control means for alternately operating the first and second means; and means operable upon the feeding of strip material onto the feedway for stopping the loader and actuating the control means and operable upon the last of the strip material in the feedway being sawed for stopping the control means and starting the loader.

9. In a machine for sawing strip material, a feedway having work supporting and guiding surfaces for supporting strip material for movement therealong, a saw unit positioned above the feedway, a driven friction wheel extending into the feedway, means for forcing a piece of strip material positioned in the feedway into engagement with the wheel and the work supporting and guiding surfaces to move the material, means for advancing and retracting the saw unit into engagement with the strip material, and control means for alternately operating the driven wheel and the advancing and retracting means.

10. A machine for sawing strip material, which comprises, a feedway having work supporting and guiding surfaces for supporting strip material for movement therealong, a saw unit positioned above the feedway, a driven friction wheel extending into the feedway, means for forcing a piece of strip material positioned in the feedway into engagement with the wheel and the work supporting and guiding surfaces to move the material, means for advancing and retracting the saw unit into engagement with the strip material, a repeating cycle timer unit for alternately operating the driven wheel and the advancing and retracting means, and a switch means operable upon placement of a piece of strip material into the feedway for starting said timer unit.

11. A machine for sawing strip material; which comprises; a feedway having work supporting and guiding surfaces for supporting strip material for movement therealong; a loader conveyor for retaining a supply of strip material and feeding the material onto the feedway; a saw unit positioned above the feedway; a driven friction wheel extending into the feedway; freely rotatable wheels movable into engagement with the strip material for forcing the material into engagement with the driven wheel and the work supporting and guiding surfaces to move the material; means for advancing and retracting the saw unit into engagement with the strip material; control means for alternately operating the driven wheel and the advancing and retracting means; and switch means operable upon the feeding of material onto the feedway for stopping the loader conveyor, moving the rotatable wheels into engagement with the material and starting the control means.

12. In a machine for processing strip material, a feedway having work supporting and guiding surfaces for supporting strip material for movement therealong, a saw unit positioned above the feedway, a driven friction wheel extending into the feedway, freely rotatable wheels movable into engagement with the strip material for forcing the material against the driven wheel and the work supporting and guiding surfaces to move the material, means for advancing and retracting the saw unit into engagement with the strip material, a drill unit positioned adjacent the feedway in juxtaposition to the saw unit, means operable by the retracting movement of said saw for advancing and retracting the drill unit towards and away from the material, and control means for alternately operating the driven wheel and the saw unit advancing and retracting means.

13. In a machine for processing strip material, a feedway having work supporting and guiding surfaces for supporting strip material for movement therealong, a loader conveyor for retaining a supply of strip material and feeding the material onto the feedway, a saw unit positioned above the feedway, a driven friction wheel extending into the feedway, freely rotatable wheels movable into engagement with the strip material for forcing the material against the driven wheel and the work supporting and guiding surfaces to move the material, means for advancing and retracting the saw unit into and out of engagement with the strip material, a drill unit positioned adjacent the feedway in juxtaposition to the saw unit, means operable by the retracting movement of the saw unit for advancing and retracting the drill unit towards and away from the material, control means for alternately operating the driven wheel and the saw unit advancing and retracting means, and switch means operable upon the placement of material onto the feedway for stopping the loader conveyor, moving the rotatable wheels into engagement with the material and starting the control means.

14. In an automatic strip processing machine; a feedway having work supporting and guiding surfaces for supporting strip material for movement therealong; a saw, a drill and a pusher each positioned adjacent the feedway for movement towards and away from the strip material to saw, drill and unload the material respectively; a driven friction wheel extending into the feedway; freely rotatable wheels movable into engagement with the strip material for forcing the material into engagement with the driven wheel and the work supporting and guiding surfaces to move the material; means for advancing and retracting the saw, drill and pusher towards and away from the strip material; and control means for alternately operating the driven wheel and the advancing and retracting means.

15. In an automatic strip processing machine; a feedway having work supporting and guiding surfaces for supporting strip material for movement therealong; a loader conveyor for retaining a supply of strip material and feeding the material onto the feedway; a saw, a drill and a pusher each positioned adjacent the feedway for movement towards and away from the strip material to saw, drill and unload the material respectively; a driven friction wheel extending into the feedway; freely rotatable wheels movable into engagement with the strip material for forcing the material against the driven wheel and the work supporting and guiding surfaces to move the material; means for advancing and retracting the saw towards and away from the strip material; means operated by the retracting movement of the saw for advancing and retracting the drill and pusher towards and away from the material; control means for alternately operating the driven wheel and the saw advancing and retracting means; and switch means operable upon the feeding of material onto the feedway for stopping the loader conveyor, moving the rotatable wheels against the material and starting the control means.

16. In a machine for sawing strip material, a feedway having work supporting and guiding surfaces for supporting strip material for movement therealong, a saw unit positioned above the feedway, means for moving the material along the feedway, means for moving the saw unit towards and away from the material, and a control circuit comprising a switch means positioned in said feedway for closure upon the placement of strip material in the feedway, and a repeating cycle timer unit operated by the closure of the switch means for alternately operating the saw unit moving means and the material moving means for preselected lengths of time.

17. In a machine for sawing strip material, a feedway having work supporting and guiding surfaces for supporting strip material for movement therealong, a loader conveyer for feeding strip material onto the feedway, a saw unit positioned above the feedway, means for moving the strip material along the feedway, means for moving the saw unit towards and away from the feedway, and a control circuit comprising a start switch for starting the loader conveyer, a switch means positioned in said feedway for closure upon the feeding of strip material onto the feedway to stop the loader conveyer, circuit means for operating said material moving means upon closure of the switch means, a relay circuit energized by closure of the switch means after a time delay sufficient to allow the strip material to be moved under the saw unit, and a repeating cycle timer unit operated by the relay circuit for alternately operating the saw unit moving means and the material moving means for preselected lengths of time.

18. In a machine for processing strip material, a feedway having work supporting and guiding surfaces for supporting strip material for movement therealong, a saw unit positioned above the feedway, a drill unit positioned adjacent the feedway and in juxtaposition to the saw unit, first means for moving the strip material along the feedway, second means for moving the saw unit towards and away from the material, third means for moving the drill unit towards and away from the material, and a control circuit comprising first switch means positioned in the feedway for closure upon the placement of strip material in the feedway, circuit means for operating said first means upon closure of the first switch means, a relay circuit energized by closure of the first switch means after a time delay sufficient to allow the material to be moved adjacent the saw and drill units, a repeating cycle timer unit operated by the relay circuit for alternately operating the second means and the first means for preselected lengths of time, and second switch means closed by the movement of the saw unit away from the material for operating the third means.

19. In an automatic strip processing machine, a feedway having work supporting and guiding surfaces for supporting strip material for movement therealong, a loader conveyer for feeding single strips of said material onto the feedway, a saw unit and a drill unit positioned adjacent the feedway, means for moving the material along the feedway, first and second solenoid means for moving the saw unit and drill unit towards and away from the material respectively, and a control circuit comprising a start switch for starting the loader conveyer, first switch means positioned in said feedway for closure upon the feeding of strip material onto the feedway to stop the loader conveyer, circuit means for operating said material moving means upon closure of the first switch means, a first time delay relay circuit energized by closure of the first switch means after a time delay sufficient to allow the material to be moved adjacent the saw and drill units, a repeating cycle timer unit operated by the first relay circuit for alternately operating the first solenoid means and said circuit means, second switch means closed by the movement of the saw unit away from the material for operating the second solenoid means, and a second time delay relay circuit connected to the timer unit and circuit means to insure completion of the operation of the second solenoid means before each operation of the circuit means.

References Cited in the file of this patent
UNITED STATES PATENTS

| | | |
|---|---|---|
| 1,968,091 | Nash | July 31, 1934 |
| 2,634,769 | Stauffer | Apr. 14, 1953 |
| 2,664,927 | Pierce | Jan. 5, 1954 |
| 2,705,511 | Latta | Apr. 5, 1955 |
| 2,722,731 | Tarte | Nov. 8, 1955 |
| 2,789,598 | Berger | Apr. 23, 1957 |
| 2,962,063 | Gussler | Nov. 29, 1960 |